United States Patent [19]

Kuschel et al.

[11] 4,391,730
[45] Jul. 5, 1983

[54] NEMATIC LIQUID CRYSTAL COMPOUNDS AND USE AND DEVICE FOR USING THE SAME

[75] Inventors: Frank Kuschel; Dietrich Demus, both of Halle; Doris Pfeiffer, Steinbach; Hans-Joachim Deutscher, Halle, all of German Democratic Rep.

[73] Assignee: VEB Werk fuer Fernsehelektronik Berlin im VEB Kombinat Mikroelektronik, Berlin, German Democratic Rep.

[21] Appl. No.: 183,567

[22] Filed: Sep. 2, 1980

Related U.S. Application Data

[63] Continuation of Ser. No. 65,397, Aug. 9, 1979, abandoned.

[51] Int. Cl.³ .................... C09K 3/34; G02F 1/13
[52] U.S. Cl. ...................... 252/299.1; 252/299.5; 252/299.61; 252/299.63; 252/299.67; 350/349; 350/350 R
[58] Field of Search .......... 252/299.5, 299.61, 299.63, 252/299.67, 299.1; 350/349, 350 R

[56] References Cited

U.S. PATENT DOCUMENTS

| | | | |
|---|---|---|---|
| 3,923,857 | 12/1975 | Boller et al. | 252/299.67 |
| 3,981,817 | 9/1976 | Boller et al. | 252/299.67 |
| 4,180,475 | 12/1979 | Schadt et al. | 252/299.5 |

FOREIGN PATENT DOCUMENTS

| | | | |
|---|---|---|---|
| 2257588 | 6/1973 | Fed. Rep. of Germany | 252/299.61 |
| 2846409 | 6/1979 | Fed. Rep. of Germany | 252/299.61 |
| 2854310 | 6/1979 | Fed. Rep. of Germany | 252/299.63 |
| 132591 | 10/1970 | German Democratic Rep. | 252/299.63 |
| 105701 | 5/1979 | German Democratic Rep. | 252/299.63 |
| 54-6884 | 1/1979 | Japan | 252/299.63 |
| 2017742 | 10/1979 | United Kingdom | 252/299.63 |

OTHER PUBLICATIONS

Demus, D., "Nonemissive Electrooptic Displays," pp. 83–119 (1975).

*Primary Examiner*—Teddy S. Gron
*Attorney, Agent, or Firm*—Jordan and Hamburg

[57] ABSTRACT

A nematic liquid crystal for modulating light in electro-optical devices comprises:

A. A 5-substituted-2-(4-substituted-phenyl)-pyrimidine of the formula

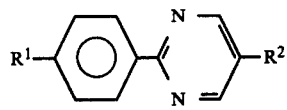

or a homolog thereof, $R^1$ and $R^2$ being the same or different and being selected from the group consisting of $C_nH_{2n+1}-$, $C_nH_{2n+1}O-$, $C_nH_{2n+1}COO-$ or $C_nH_{2n+1}CO-$ and $n=1$ to 12;

B. A 4-substituted-cyclohexanecarboxylic acid-(4-substituted-phenylester) of the formula

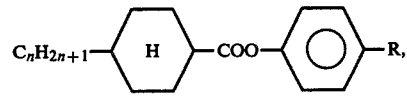

or a homolog thereof, R being $-C_mH_{2m+1}$, $-OC_mH_{2m+1}$, $-COC_mH_{2m+1}$, $-CN$ or $-NO_2$, and n, m = 1–10, and C. A 4-substituted-benzoic acid-(4-cyanophenylester) of the formula

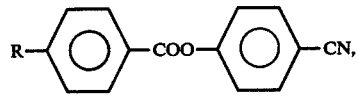

or a homolog thereof, R being $C_nH_{2n+1}-$ or $C_nH_{2n+1}O-$ and $n=1$ to 14.

11 Claims, No Drawings

NEMATIC LIQUID CRYSTAL COMPOUNDS AND USE AND DEVICE FOR USING THE SAME

This is a continuation of application Ser. No. 065,397, filed Aug. 9, 1979, now abandoned.

BACKGROUND OF THE INVENTION

This invention relates to nematic liquid crystal mixtures and for their use in electro-optical devices for the modulation of the transmittant or reflected light and for the colored or black-and-white rendition of numerals, symbols and moving or still pictures.

The use of liquid crystals for this purpose is known. This kind of device is based on the fact that the preferential orientation in thin layers of liquid crystals can be modified by application of an electrical field. With these modifications of the orientation goes a modification of the optical behaviour (double refraction, rotatory properties and light absorption).

Depending on the specific pretreatment of the electrodes and the initial orientation, the dielectric anisotropy, and conductivity, the dichroism obtained by addition of suitable materials and depending on the strength and direction of the applied electric field, various electro-optical effects are observed and can be made use of for technical purposes (M. Tobias: International Handbook of Liquid Crystal Displays 1975–1976, Ovum Ltd., London 1976; G. Meier, E. Sackmann, J. G. Grabmaier: Applications of Liquid Crystals, Springer-publication, Berlin-Heidelberg-New York 1975).

One prior art process, for instance, is based on the fact that by application of an electric field the rotatory property of a layer having a twisted structure may be eliminated and permeability or extinction of the introduced light between two parallel (crossed) polarizers may thus be obtained (M. Schadt, W. Helfrich: Applied Physics Letters 18, 127 (1971).

Depending on the basic electro-optical effect the compounds employed must meet certain requirements, their melting point must be far below room temperature (if possible below 0° C.), their clear transparency temperatures must be above +50° C., they must have a low viscosity, a high chemical and thermal stability and a stability upon continuous exposure to daylight. In addition, the materials must have a specific dielectric anisotropy, preferably a high positive anisotropy, and a low electric conductivity.

Pure compounds which meet all these requirements are not available. For this reason mixtures of different compounds which frequently belong to different classes of chemical structure are employed. Because of limited miscibility it is, however, not possible to combine any desired compounds.

It is known to employ in the manufacture of electro-optical cells, compounds from the homologous series of the phenyl pyrimidines having the general formula

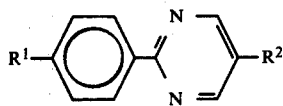
(A)

In this formula $R^1$ and $R^2$ signify the same or different substituents, for instance, $C_nH_{2n+1}-$, $C_nH_{2n+1}O-$, $C_nH_{2n+1}COO-$ or $C_nH_{2n+1}CO-$ and $n=1$ to 12.

(H. Zaschke, H. Schubert, F. Kuschel, F. Dinger, D. Demus, economic patent of the German Democratic Republic 95892).

For instance, a mixture identified herein as

Mi3      (A)

consists of two components of the same chemical group:

| | |
|---|---|
| 5-n-hexyl-2-(4-n-hexyloxyphenyl)-pyrimidine | 68.5 mol % |
| 5-n-hexyl-2-(4-n-nonyloxyphenyl)-pyrimidine | 31.5 mol % |

This mixture has the following properties:

| | |
|---|---|
| Melting temperature | +4° C., |
| Clear transparency temperature | 60° C., |
| DK anisotropy | +0.7 |
| Voltage requirement for the electric field effects in twisted layers: | |
| 10% voltage | 6.0 V |
| 90% voltage | 8.2 V |
| Starting time (after application of the four-fold threshold limited to a twisted layer at 25° C. and a layer thickness of 20 μm) | 170 ms |
| Switching off time | 320 ms. |

This mixture does not meet the requirements regarding melt behaviour and the required voltages for the electric field effect in twisted layers. The melting temperature of the thermodynamically stable, solid crystal phase should be below 0° C. if possible and the 10% voltage should be below 2 V.

It has also become known to use for the making of liquid crystal displays compounds taken from the homolog series of 4-substituted-cyclo-hexanecarboxylic acid-(4-substituted-phenylesters). These compounds have the general formula

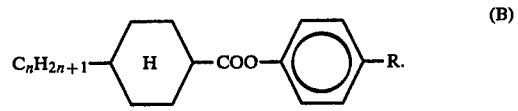
(B)

In this formula R may be $C_mH_{2m+1}$, $-OC_mH_{2m+1}$, $-COC_mH_{2m+1}$, $-CN$ or $-NO_2$ and n, m=1–10. (H.-J. Deutscher, F. Kuschel, H. Schubert, D. Demus, Economic patent 105,701 of the German Democratic Republic).

For instance a mixture identified herein as

Mi14      (B)

may, for instance, consist of three components of this group of compounds as follows:

| | |
|---|---|
| 4-n-propyl-cyclohexanecarboxylic acid-(4-cyanophenylester) | 34.5 mol % |
| 4-n-butyl-cyclohexanecarboxylic acid-(4-cyanophenylester) | 31 mol % |
| 4-n-pentyl-cyclohexanecarboxylic acid-(4-cyanophenylester) | 34.5 mol % |

This mixture has the following properties:

| | |
|---|---|
| Melting temperature | +12.5 to +16° C. |
| Clear transparency temperature | 72° C. |
| DK anisotropy | +6.5 |
| 10% voltage | 1.4 V |
| 90% voltage | 2.1 V |
| Starting time | 115 ms |
| Switching off time | 240 ms |

This mixture likewise does not meet the above formulated requirements insofar as its melt behavior is concerned.

For making displays with liquid crystals compounds of the homolog series of 4-substituted-benzoic acid-(4-cyanophenylester) can furthermore be used. These compounds have the general formula

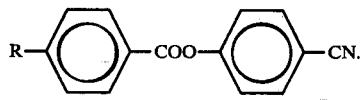 (C)

In these formulas R is $C_nH_{2n+1}-$ or $C_nH_{2n+1}O-$ and n=1 to 14.

(A Boller, H. Scherrer, M. Schadt: Proceedings of the JEEE 60 1002 (1972); H.-J. Deutscher, F. Kuschel, H. Bargenda, H. Schubert, D. Demus: economic patent No. 106,120 of the German Democratic Republic).

An example of these compounds is the mixture identified herein as

Mi16.     (c)

It consists of three components of this group of compounds as follows:

| | |
|---|---|
| 4-n-hexyl-benzoic acid-[4-cyanophenylester] | 36 mol % |
| 4-n-heptyl-benzoic acid-[4-cyanophenylester] | 37 mol % |
| 4-n-octyl-benzoic acid-[4-cyanophenylester] | 27 mol % |

This mixture has the following properties:

| | |
|---|---|
| Melting temperature | +13° to 21° C. |
| Clear transparency temperature | 53° C. |
| DK anisotropy | about +20 |
| 10% voltage | 1.7 V |
| 90% voltage | 2.3 V |
| Starting time | 420 ms |
| Switching off time | 600 ms. |

The melt temperature of this mixture Mi 16 is too high to permit its technical use in spite of the comparatively favorable dielectric properties.

It is therefore an object of this invention to provide for compound mixtures which are chemically and thermally stable, have melting points far below room temperature and clear transparency points above 50° C. and are distinguished by a particularly low voltage requirement. It is a further object of this invention to provide for the use of these mixtures of compounds in electro-optical structural elements.

A more general object of the invention is to provide for mixtures of liquid crystals which have a melting temperature and a voltage requirement lower than that of the components of the mixture.

SUMMARY OF THE INVENTION

These objects are met by liquid crystal mixtures which are mixtures between components belonging to the following groups:

A. 5-substituted-2-(4-substituted-phenyl)-pyrimidines of the formula

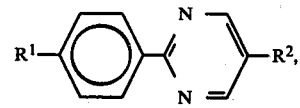

wherein $R^1$ and $R^2$ may be the same or different and may for instance be $C_nH_{2n+1}-$, $C_nH_{2n+1}O-$, $C_nH_{2n+1}COO-$ or $C_nH_{2n+1}CO-$ and n=1 to 12;

B. 4-substituted-cyclohexanecarboxylic acid-(4-substituted-phenylester) of the formula

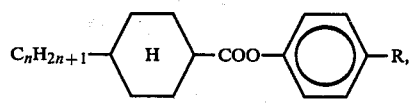

wherein R is $-C_mH_{2m+1}$, $-OC_mH_{2m+1}$, $-COC_mH_{2m+1}$, $-CN$ or $-NO_2$, and n, m=1–10, and C. 4-substituted-benzoic acid-4-cyanophenylesters of the general formula

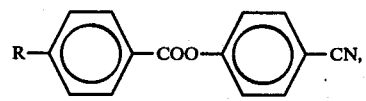

wherein R is $C_nH_{2n+1}-$ and n=1 to 14 or $C_nH_{2n+1}O-$. The invention includes the use of these mixtures in electro-optical devices and includes an electro-optical device for the modulation of transmittent or rejected light and for the rendition of numerous symbols and images in which the above mixtures are the agents used for the modulation.

The various components of the liquid crystal composition are preferably present in the following proportions (in mol %): component A, 10 to 50 mol %; component B, 30 to 90 mol %; and component C, 10 to 50 mol %. Component A may also be present in an amount of 20 to 80 mol %, component B in an amount of 10 to 60 mol %, and component C in an amount of 20 to 65 mol %.

The following examples will further illustrate the invention.

PREFERRED EMBODIMENTS

Example 1

A mixture was formed of the following composition:

| | | |
|---|---|---|
| (B) | MI 14 | 70 mol % |
| (A) | 5-n-butyl-2-(4-n-heptyloxyphenyl)-pyrimidine | 30 mol % |

This nematic mixture had the following properties:

| | |
|---|---|
| Melting temperature | +1° to 3° C. |
| Clear transparency | |

| | | |
|---|---|---|
| temperature | 58° C. | |
| At 10% voltage | 1.45 V | |
| At 90% voltage | 2.2 V | |
| Starting time (after application of the 4-fold threshold voltage to a twisted layer at 25° C. and a layer thickness of 20 μm) | 190 ms | |
| Switching-off time | 280 ms | |

Example 2

A mixture was prepared of the following composition:

| | | |
|---|---|---|
| (B) | Mi 14 | 70 mol % |
| (A) | Mi 3 | 30 mol % |

This mixture had the following properties:

| | |
|---|---|
| Melting temperature | In a microscopic preparative this nematic mixture did not show any crystallization at a temperature of -20° C. after 36 hours. |
| Clear transparency temperature | 60° C. |
| At 10% voltage | 1.6 V |
| At 90% voltage | 2.2 V |
| Starting time | 150 ms |
| Switching-off time | 240 ms |

By combining phenylpyrimidine compounds as disclosed in Examples 1 and 2, the melting temperature range of the formed mixtures was considerably lowered compared with the range of the mixture 14 without affecting the electro-optical properties.

Example 3

A mixture was formed of the following composition:

| | | |
|---|---|---|
| (B) | Mi 14 | 65 mol % |
| (B) | 4-n-butyl-cyclohexanecarboxylic acid-(4-ethoxyphenylester) | 13 mol % |
| (B) | 4-n-butyl-cyclohexanecarboxylic acid-(4-n-hexyloxyphenylester) | 22 mol % |

This mixture had the following properties:

| | |
|---|---|
| Melting temperature | 0° to +2° C. |
| Clear transparency temperature | 68° C. |
| At 10% voltage | 1.75 V |
| At 90% voltage | 2.7 V |
| Starting time | 175 ms |
| Switching-off time | 570 ms |

By adding the above referred to cyclohexanecarboxylic acid phenylesters, a distinct broadening of the nematic phase range after applying lower temperatures was obtained.

Example 4

A mixture was prepared as follows:

| | | |
|---|---|---|
| (B) | Mi 14 | 53 mol % |
| (C) | Mi 16 | 47 mol % |

This mixture had the following properties:

| | |
|---|---|
| Melting temperature | -6° to 0° C. |
| Clear transparency temperature | 59° C. |
| At 10% voltage | 1.2 V |
| At 90% voltage | 1.9 V |
| Starting time | 310 ms |
| Switching-off time | 450 ms |

Apart from the modification of the melting range after lower temperatures it is noted that the reduction of the voltages which are required to obtain the electro-optical effect in twisted layers is particularly good in this mixture.

Example 5

0.4% of the dichroitic dyestuff indophenol-blue was added to the mixture prepared according to Example 4. The dyestuff dissolved upon heating of the mixture.

Using this thus modified mixture a 20 μm thick oriented specimen with a horizontal layer was placed between transparent electrically conductive electrodes. Upon transmission of white polarized light the layer took on a blue color when the preferred direction of the nematic mixture was in the polarization plane of the light.

After application of an electric field (2 V, 50 Hz) the horizontally disposed layer was reoriented in the direction of the field. In consequence of this step, the dissolved dyestuff molecules were also moved into a place where they were disposed in parallel to the direction of the field and light radiation insofar as the direction of the maximum light absorption was concerned. There then occurred a color change from blue to colorless. This color change could be repeated as often as desired by switching on or switching off the electrical field.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A nematic liquid crystal composition for use in electro-optical devices for modulating transmitted or reflected light and for the rendition of numerals, symbols and images, comprising a mixture of at least one compound of formula (A)

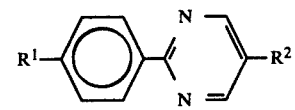

wherein $R^1$ is $C_nH_{2n+1}O-$ and $R^2$ is $C_nH_{2n+1}-$, where n=1 to 12, and at least one compound of formula (B)

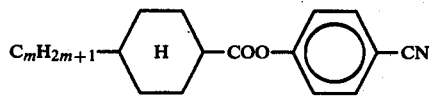

where m=1 to 10.

2. The composition of claim 1 wherein the individual components are present in the following proportions:
component A, 10 to 50 mol % and
component B, 30 to 90 mol %.

3. The composition of claim 1 wherein the individual components are present in the following proportions:
component A, 20 to 80 mol % and
component B, 10 to 60 mol %, and
component C, 20 to 65 mol %.

4. The composition of claim 1 wherein component A is at least one of a 5-n-alkyl-2-(4-n-alkyloxyphenyl)-pyrimidine having from 4 to 9 carbon atoms in the alkyl groups.

5. The composition of claim 4 wherein component A is a mixture of 5-n-hexyl-2-(4-n-hexyloxyphenyl)-pyrimidine and 5-n-hexyl-2-(4-n-nonyloxyphenyl)-pyrimidine.

6. The composition of claim 4 wherein component A is 5-n-butyl-2-(4-n-heptyloxyphenyl)pyrimidine.

7. The composition of claim 1 wherein component B is at least one of a 4-n-alkylcyclohexane carboxylic acid-(4-cyanophenylester) having from 3 to 5 carbon atoms in the alkyl group.

8. The composition of claim 7 wherein component B is a mixture of the 4-cyanophenylesters of 4-n-propyl-cyclohexanecarboxylic acid, 4-n-butyl-cyclohexanecarboxylic acid, and 4-n-pentyl-cyclohexanecarboxylic acid.

9. The composition of claim 1 additionally comprising a dichroitic dyestuff.

10. The composition of claim 9 wherein said dichroitic dyestuff is indophenol blue.

11. An electro-optical device for modulating transmitted or reflected light and for the rendition of numerals, symbols, and images containing a composition of claim 1 having a melting point equal to or less than approximately 0° C. and a 10% voltage below approximately 2 volts.

* * * * *